(12) United States Patent
Saxena et al.

(10) Patent No.: US 8,769,228 B2
(45) Date of Patent: Jul. 1, 2014

(54) STORAGE DRIVE BASED ANTIMALWARE METHODS AND APPARATUSES

(75) Inventors: Paritosh Saxena, Portland, OR (US); Nicholas D. Triantafillou, Portland, OR (US); Paul J. Thadikaran, Rancho Cordova, CA (US); Mark E. Scott-Nash, Boulder, CO (US); Sanjeev N. Trika, Portland, OR (US); Akshay Kadam, Bangalore (IN); Karthikeyan Vaidyanathan, Bangalore (IN); Richard Mangold, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 388 days.

(21) Appl. No.: 12/971,670

(22) Filed: Dec. 17, 2010

(65) Prior Publication Data

US 2012/0159041 A1 Jun. 21, 2012

(51) Int. Cl.
| | |
|---|---|
| *G06F 12/00* | (2006.01) |
| *G06F 13/00* | (2006.01) |
| *G06F 13/28* | (2006.01) |
| *H04L 29/06* | (2006.01) |
| *G06F 21/00* | (2013.01) |
| *G06F 11/30* | (2006.01) |
| *G06F 12/14* | (2006.01) |
| *G06F 7/04* | (2006.01) |
| *G06F 17/30* | (2006.01) |
| *G11C 7/00* | (2006.01) |
| *G06F 11/00* | (2006.01) |
| *G06F 12/16* | (2006.01) |
| *H04N 7/16* | (2011.01) |

(52) U.S. Cl.
USPC .......... 711/163; 711/111; 711/154; 713/167; 713/182; 713/188; 726/17; 726/22; 726/28; 726/29

(58) Field of Classification Search
USPC .......... 711/111, 154, 163–164; 713/167, 182, 713/188; 726/17, 22, 27–29
See application file for complete search history.

(56) References Cited

U.S. PATENT DOCUMENTS

| | | | |
|---|---|---|---|
| 8,219,724 B1 * | 7/2012 | Caruso et al. | 710/36 |
| 2003/0208670 A1 | 11/2003 | Dawkins et al. | |
| 2004/0158698 A1 | 8/2004 | Rothman et al. | |
| 2006/0184806 A1 | 8/2006 | Luttmann et al. | |
| 2007/0180210 A1 * | 8/2007 | Thibadeau | 711/163 |
| 2008/0016313 A1 * | 1/2008 | Murotake et al. | 711/173 |
| 2010/0011350 A1 * | 1/2010 | Zayas | 717/171 |
| 2010/0106928 A1 | 4/2010 | Toda et al. | |
| 2011/0252468 A1 * | 10/2011 | Tas et al. | 726/11 |
| 2012/0060217 A1 * | 3/2012 | Sallam | 726/23 |

OTHER PUBLICATIONS

Messmer, Ellen, Disk-drive encryption gets boost from Opal standards effort, Jan. 29, 2009, Available at: http://www.networkworld.com/news/2009/012909-opal.html.*

International Search Report and Written Opinion for PCT Patent Application No. PCT/US2011/063175, mailed on May 4, 2012, 9 pages.

* cited by examiner

*Primary Examiner* — Ryan Bertram
(74) *Attorney, Agent, or Firm* — Konrad Raynes Davda & Victor LLP; David W. Victor

(57) ABSTRACT

An anti-malware approach uses a storage drive with the capability to lock selected memory areas. Platform assets such as OS objects are stored in the locked areas and thus, unauthorized changes to them may not be made by an anti-malware entity.

7 Claims, 4 Drawing Sheets

STORAGE DRIVE BASED ANTIMALWARE METHODS AND APPARATUSES

BACKGROUND

Malware (or malicious code) is a catch-all term used to refer to various types of software that can cause problems or damage a computer. It encompasses viruses, worms, Trojan horses, macro viruses, rootkit malware, and backdoors. Malware has evolved to be increasingly more stealthy and targeted.

Malware has become stealthier, in some cases, hiding deep inside the core operating system by infecting kernel modules (e.g., rootkits). Rootkits, especially the ones executing with Ring 0 privileges are very difficult or impossible to detect by current anti-virus solutions (AVS). For example, Ring 0 rootkits may feed incorrect information to anti-virus solutions and thereby disrupt their normal functioning.

Accordingly, new approaches for protecting platforms against malware may be desired.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Malware may attack the storage subsystem, including storage drive locations, where core operating system modules such as registry hives, dynamic link library (DLL) modules, kernel modules, master boot record modules, etc. are stored. In some embodiments, certain storage drive locations (e.g., sectors, blocks, and/or ranges of the same) containing such modules are protected by their storage drive control logic so that unauthorized updates are prohibited.

Figure 1:
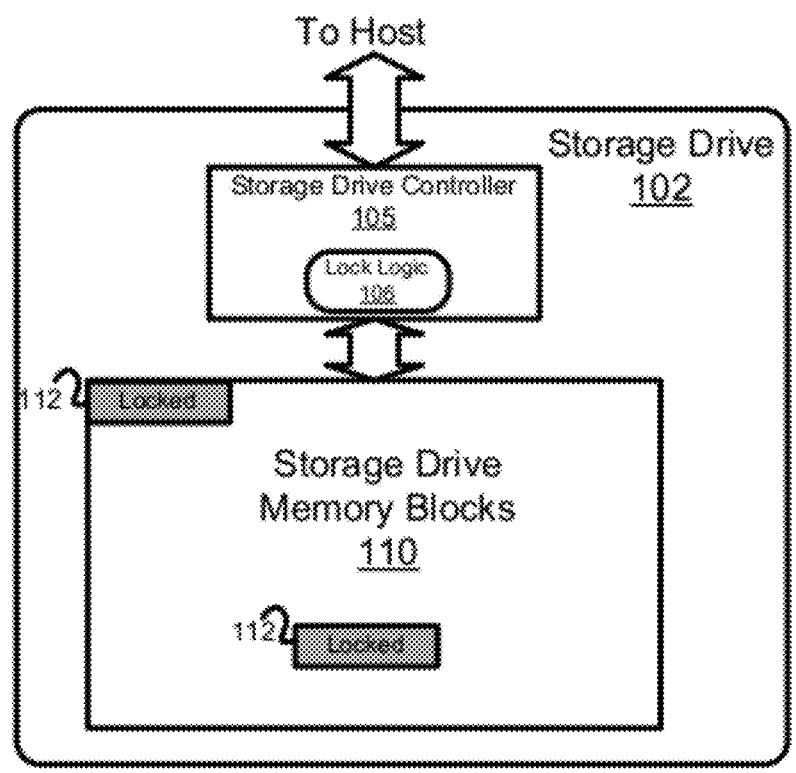
FIG. 1 is a block diagram of a storage drive with an anti-malware lock capability in accordance with some embodiments.

FIG. 1 is a block diagram showing a storage drive device 102 in accordance with some embodiments. It may be of any suitable non-volatile writeable technology such as a solid-state drive (SSD), magnetic hard disk drive (HDD), or thumb drive, to mention just a few. Storage drive 102 generally comprises read/writeable memory units (blocks or sectors) 110 and a storage drive controller 105 coupled between the memory and a host to write data from the host into the memory blocks and to read data from the memory blocks back to the host. The host typically corresponds to a platform operating system, whether it is for a computer with one or more processors or for a portable device with a system-on-chip processor.

The storage drive controller 105 has lock logic 106 (e.g., implemented within firmware with available writeable memory) for providing locked memory blocks 112 that are only modifiable with an appropriate key or password to be evaluated by the lock logic 106. There are storage drives currently available that may provide such a capability for selectively "locking" out portions of the memory in this manner. For example, Opal is a standard defined by the Trusted Computing Group for providing storage drives with various security features including the just described memory lock capabilities. With an anti-malware scheme in accordance with some embodiments, at least some OS modules are stored in locked memory blocks and not allowed to be modified unless by a valid user such as an authorized trusted third-party entity with the appropriate password.

Figure 2:
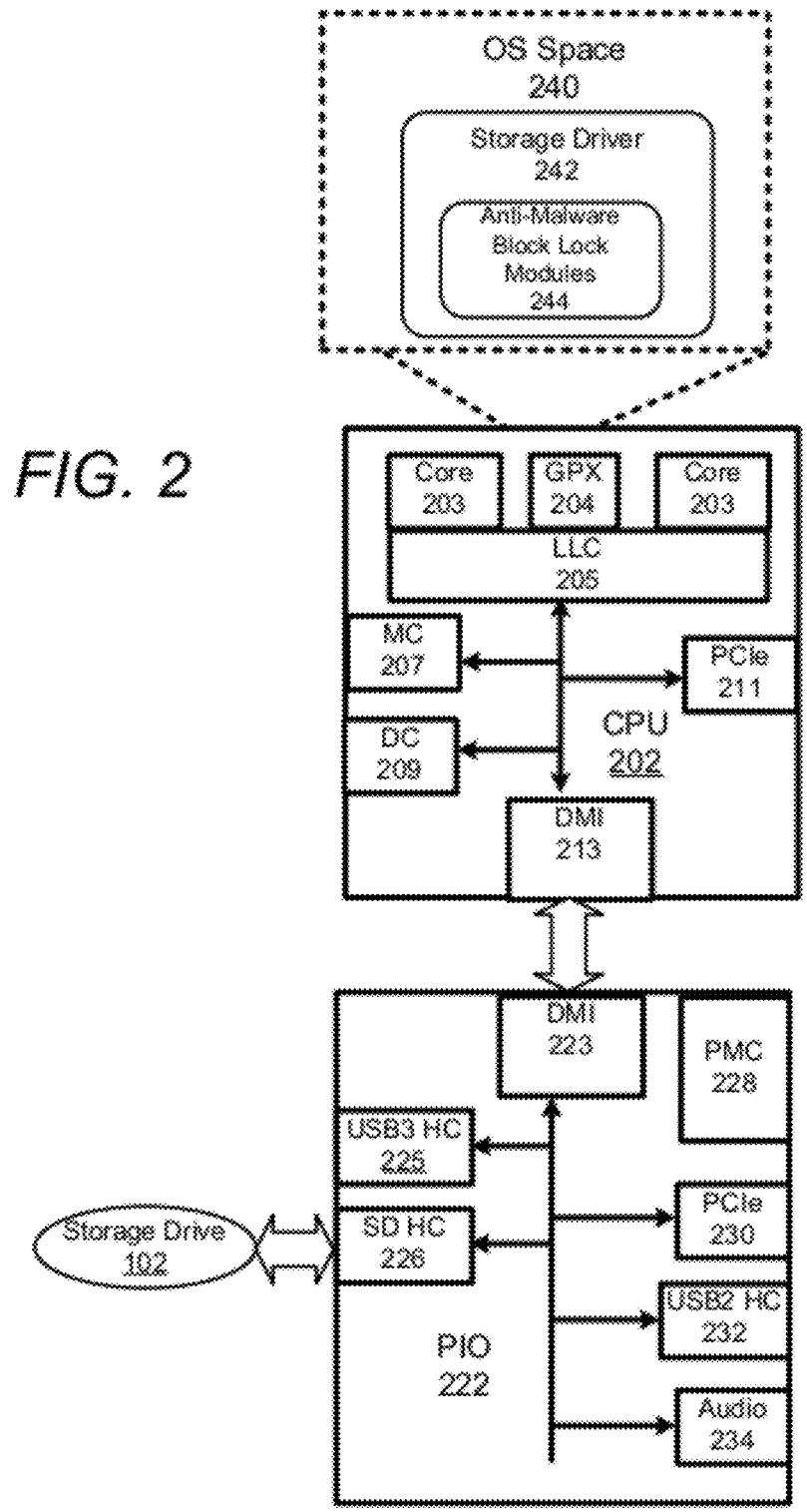
FIG. 2 is a diagram showing a platform with a lock capable storage drive based anti-malware solution in accordance with some embodiments.

FIG. 2 is a block diagram of an exemplary platform having a storage drive with locked memory blocks for holding OS components and preventing them from being modified by unauthorized entities. The platform has a CPU chip 202 and a platform I/O chip 222 coupled together via a direct media interconnect (DMI) link via DMI interfaces 213/223. The platform also includes a storage drive 102 (e.g., a solid state drive in accordance with a drive of FIG. 1) coupled to a storage drive host controller 225.

The CPU chip 311 comprises one or more processor cores 203, a graphics processor 204, low level cache (LLC) 205, memory controller 207, a display interface controller 209, and a PCI Express interface controller 211. (cooperating devices such as memory a display, network interfaces, and other peripheral devices that may be part of the depicted platform when in operation are not depicted for convenience, but nonetheless, may be part of various different embodiments.) One or more of the cores 203 execute operating system software (OS space) 240. The OS software includes a storage driver 242 to facilitate data transfers between the platform and the storage drive 102. The storage driver 242 includes anti-malware block lock modules 244 for implementing an anti-malware scheme. it works in cooperation with the lock logic 106 to enable configuration and implementation of locked storage drive blocks to protect OS assets and at the same time, to allow the system to run without appreciable encumbrance.

The PIO chip 222 includes various peripheral device interfaces such as a USB2 interface 232, audio interface 234, PCIe interface 230, and USB3 interface 225. It also includes a power management controller (PMC) 228 to manage power allocation and some of the power management policies for the platform. The PIO chip also includes a storage drive host controller 226 for controlling data transfers between the storage drive and the other parts of the platform. For example, the host controller 226 could utilize an AHCI or an SATA compliant controller. (The Advanced Host Controller Interface (AHCI) is a programming-specification which defines the operation of Serial ATA host-controllers (also known as host bus adapters) in a non implementation-specific manner. The specification describes a system memory structure for computer hardware vendors in order to exchange data between host system memory and the attached storage-devices.

Figure 3:
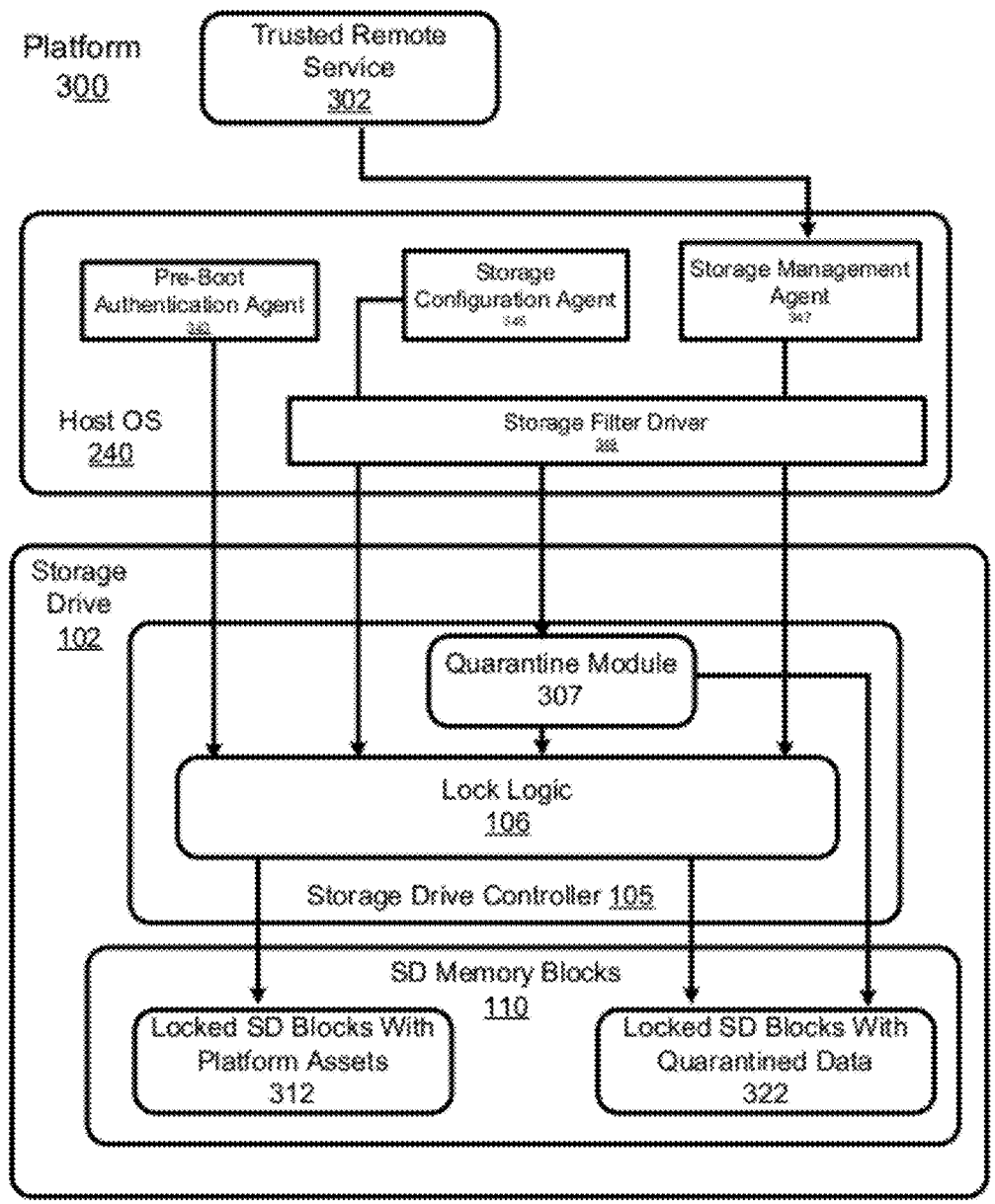
FIG. 3 is a diagram of a portion of a more detailed embodiment of a lock capable, storage drive anti-malware approach for a computing platform in accordance with some embodiments.

FIG. 3 is a diagram of a more detailed implementation of a platform 300 with an anti-malware scheme in accordance with some embodiments. This depiction focuses on the host OS 240 and storage drive 102. Also shown is a trusted remote service 302 for configuring and updating the locked sector system. The remote service could correspond to a third-party anti-malware service or information technology entity connected to the platform via a network link. The trusted remote service would have the appropriate password or key for configuring and updating locked sectors in the drive. (Note that the use of a remote third party is not necessary for implementing the invention. For example, the platform's user could have the information and be permitted to configure the storage drive and update locked sector information.)

The OS space (or Host OS) 240 has a pre-boot authentication agent (PBAA) 343, a storage configuration agent (SCA) 345, a storage management agent (SMA) 347, and a storage filter driver 349. The storage drive 102 has a drive controller 105 and non-volatile, writeable memory (e.g., magnetic, flash, etc.) 110. The storage drive controller 105 has lock logic 106 and quarantine module 307. The memory, among other things, comprises a set of locked platform assets blocks 312 and quarantine data blocks 322 that are also locked. (The vast, remaining portion of memory will typically not be locked but used in other platform capacities such as facilitating application code and data space, file storage, etc.)

The pre-boot authentication agent 343 is used to authenticate a user for normal platform operation. For example, the storage drive may use a self encryption technique, and the pre-boot authentication agent allows the user to enable storage drive decryption, so that it can be used with the platform, by presenting to the controller 105 an appropriate storage drive password. (This would normally not be the same as the password or key used for locking techniques described herein.) The storage drive controller (e.g., an Opal compliant drive controller) 105 has the ability to implement a shadow MBR (master boot record) to perform pre-boot authentication in cooperation with the pre-boot authentication agent 343. Traditionally (e.g., with non self-encrypting drives), the Master Boot Record is typically contained in the first sector of the platform's primary drive. The MBR identifies where the active partition is, and then starts the boot program for the boot sector of that partition. The boot sector identifies where the operating system is located and enables the boot information to be loaded into the computer's main memory. On the other hand, in some embodiments, with a shadow MBR implementation, after booting, when the BIOS (or equivalent) attempts to read the master boot record, the drive gets redirected to a shadow MBR, typically a Linux or MS-DOS kernel (depending on the implemented platform). Then, the user or administrator authenticates against an encrypted key hiding on the drive (e.g., in a memory sector or in writeable, non-volatile memory such as flash within the storage drive controller/firmware domain. This method (e.g., with an Opal compliant drive) may be used for encrypting data stored on the drive, as well as for locking selected storage drive blocks.

The storage configuration agent (SCA) 345, through the storage filter driver 349, facilitates initial configuration of the lock parameters for the storage drive when the platform is known to be in a clean state, e.g., after it is initially manufactured. It may establish an initial lock/unlock password, and it also may define memory blocks (312) to be locked for storing key platform assets (DLLs, registry values, etc.).

The storage management agent (SMA) 347 allows for the lock parameters to be modified over time by an appropriate user, e.g., a trusted third-party entity or the computer user, itself, having the lock password. Through the SMA, changes to OS parameters and the memory blocks where they are stored and locked may be changed. In some embodiments, these changes are stored in the quarantine section 322, and then the changes are actually implemented the next time the system boots, when it is assumed/known to be clean.

The Quarantine module receives the normal storage drive data transfer requests from the OS (by way of the storage filter driver 349) and forward them to the storage drive controller if they are not write attempts implicating a locked section of memory. If a request to write or otherwise change data in a locked memory section comes into the drive (through the quarantine filter module 307), then it is diverted to the quarantine memory section 322 and evaluated later to be effectuated at the next boot-up if deemed acceptable. At the same time, the quarantine module 307 generates responses and sends them back to the OS space so that it is not left hanging. The quarantine module generates appropriate responses to satisfy the OS and not unreasonably impede platform operation.

Figure 4:
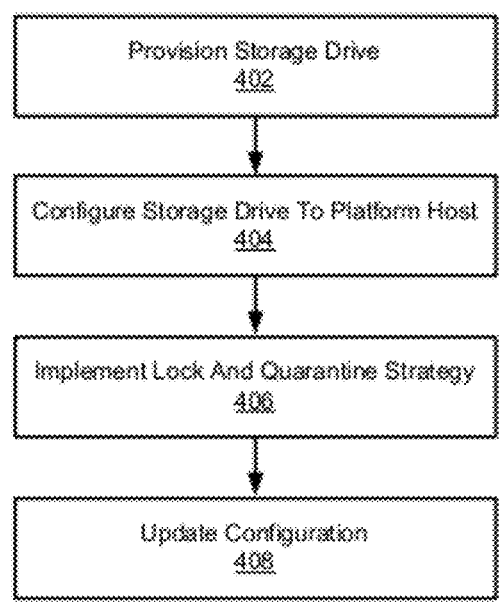
FIG. 4 is a diagram showing different stages for implementing an anti-malware scheme for a computing platform in accordance with some embodiments.

FIG. 4 shows different stages of an anti-malware scheme in accordance with some embodiments. At 402, the storage drive is provisioned. Next, at 404, the storage drive is configured for its specific platform host. At 406, pursuant to runtime operation, lock and quarantine strategies are implemented. At 408, the configuration is updated. Note that at least in some cases, these are general stages that may be preformed out of order, and they all may not necessarily be performed in the same session.

The provisioning stage involves initially setting up a storage drive when the platform is known to be clean. In this stage, The lock logic is configured on the storage drive by authenticating to the administrative service provider (a trusted third-party entity or an actual platform user). Ideally, this will be performed by an enterprise IT, OEM, or point-of-sale person, e.g., offering an anti-virus-solution bundle, or alternatively, it may be done by an experienced user. Initially, the locking functionality, e.g., in the lock logic, is enabled. This may be done, depending on vendor specific procedures, using special operation commands (e.g., negative logical block address writes, etc.) or other suitable procedures.

Next, two lock-users (e.g., two Opal users) are created and authentication is set for these users. One user may be used to authenticate using a shadow MBR stage via the pre-boot authentication agent 343, and the other user may be qualified to get access to the locked memory. Either user may be used to then install the OS on the drive. Note that at this stage, the OS will be clean and have no infections.

The configuration stage will now be discussed. The storage configuration agent (SCA) is executed to determine the sectors or logical block addresses (LBAs) associated with the OS objects and master boot record. At the end of the execution, a list of sectors/LBAs, which need to be protected, will have been generated. The locking range(s), which correspond to the sectors/LBAs discovered by the SCA, are then created in the lock logic 106. Next, another set of ranges are created for the quarantine data section. These ranges may be configurable and capacity dependent. The ranges are made "read-only" except to the qualified user, e.g., one of the users created in the provisioning stage. Next, the locks are set for power. That is, in case of power cycle, the lock logic (e.g., Opal FW) should automatically lock the ranges. At this point, the drive is ready for use.

The runtime stage will now be described. Assume that a malicious agent tries to override an OS object, which has been locked in a locked block area (312). Since the user associated with the protected ranges has not authenticated the change to the object, the change is denied. (Note that this change request denial may even occur for the user of the platform, e.g., if he/she is trying to install an application. They may not have the user clearance and necessary password/key to make such changes via a storage management agent, although, this user would likely have the storage drive encryption/decryption key to be able to otherwise use the drive with the platform, via a shadow MBR through the pre-boot authentication agent.)

From here, the storage filter driver "wraps" the error (e.g., ATA error) as an OS palatable error. In some implementations, this means that it returns an error message or other message to the OS that will not cause it to hang or otherwise be unreasonably impaired. (Note that the identification of an unauthorized change to locked area 312 and the subsequent return of a palatable message may take place in the storage filter driver, lock logic, quarantine module, or some combination of some or all of the same.) In some embodiments, the quarantine module 307 detects the change request for a protected asset in locked area 312 and writes the change request content (as if it would have been granted) into the locked quarantine area 322 and returns the palatable error message to the OS.

The update stage will now be discussed. A qualified user reboots the system and authenticates through the pre-boot authentication agent 343. The OS (including the protected platform assets) is then loaded. These assets are clean because they have been protected as described above. The storage management agent (SMA) is launched. It is also clean and protected because it was, in most cases, stored as a protected module in the locked assets area 312. The SMA may then contact a trusted remote service (usually the same qualified user that was accepted to make the updates in the first place) to process approved updates. Alternatively, the SMA may authenticate the content (e.g., requested OS module changes) that are in the quarantined area 322 for legitimacy. (For example, it could compare them against a log or script of changes approved by the trusted third party, e.g., IT administrator. The SMA could also authenticate against the lock logic (e.g., Opal firmware) per the credentials from, e.g., an anti-malware remote server (ARS). The SMA can further receive the payload from the ARS or update the protected OS assets with contents from the quarantine area.

The SMA logs out the qualified user and again, confirms that the protected ranges are "read-only". From here, the SMA may exit, and the OS boot process continues. Note at this point that malicious code could execute on the platform, but the key OS assets are locked in protected sectors.

In the preceding description and following claims, the following terms should be construed as follows: The terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

It should also be appreciated that in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

It should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS, for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. A platform comprising:
   a processor;
   an operating system (OS) to be executed by the processor, and
   a storage drive having memory blocks and lock logic to lock locked blocks comprising a group of the memory blocks, the operating system having a storage management agent that in cooperation with the lock logic, controls access to the locked blocks, the locked blocks including anti-malware application assets, wherein a qualified user associated with the anti-malware application has access to modify the anti-malware application in the locked blocks; and
   a quarantine module in the storage drive for storing writes to the locked blocks in a quarantine memory section with writing to the locked blocks, wherein during boot up operations, a determination is made as to whether to apply the writes in the quarantine memory section to the locked blocks.

2. The platform of claim 1, in which the storage drive is set up when the platform is known to be clean.

3. The platform of claim 1, in which the lock logic is configured by authenticating to the qualified user.

4. The platform of claim 3, in which the OS includes a storage configuration agent (SCA) that when executed in a provisioning stage determines logical block addresses (LBAs) for the locked blocks including locked blocks to store the anti-malware application assets.

5. The platform of claim 1, wherein the OS comprises a pre-boot authentication agent to authenticate a platform user to access the storage drive for platform operation but not to be able to unlock the locked blocks.

6. The platform of claim 1, wherein the quarantine module identifies platform asset change requests from an unauthorized user and store the change request in a quarantine region of the storage drive.

7. The platform of claim 6, in which the quarantine module returns a palatable message to the OS even though a change request is not to be implemented.

* * * * *